United States Patent
Sakaguchi et al.

[11] Patent Number: 5,832,066
[45] Date of Patent: Nov. 3, 1998

[54] AUDIO RESPONSE/REPORT DEVICE

[75] Inventors: Hiroyuki Sakaguchi; Shougo Tatuzawa, both of Kawasaki, Japan

[73] Assignee: Fujitsu Limited, Kawasaki, Japan

[21] Appl. No.: 721,108

[22] Filed: Sep. 13, 1996

Related U.S. Application Data

[63] Continuation of Ser. No. 346,279, Nov. 22, 1994, abandoned.

[30] Foreign Application Priority Data

May 20, 1994 [JP] Japan .................................. 6-107160

[51] Int. Cl.$^6$ .................................................. H04M 11/00
[52] U.S. Cl. ......................... 379/106.01; 379/88; 379/39; 379/40; 379/41
[58] Field of Search ..................................... 379/106, 105, 379/107, 41, 51, 48, 39, 40, 67, 88, 96, 89, 93, 106.01, 106.02, 106.03, 102.01, 102.07, 102.02, 93.19, 93.17, 93.25

[56] References Cited

U.S. PATENT DOCUMENTS

| | | |
|---|---|---|
| 4,897,862 | 1/1990 | Nishihara et al. ....................... 379/41 |
| 5,061,916 | 10/1991 | French et al. ........................... 379/106 |
| 5,247,568 | 9/1993 | Bergsman et al. ........................ 379/89 |
| 5,282,242 | 1/1994 | Hachinoda ................................ 379/88 |
| 5,319,698 | 6/1994 | Glidewell et al. ........................ 379/51 |
| 5,347,646 | 9/1994 | Hirosawa et al. ....................... 379/106 |
| 5,402,475 | 3/1995 | Lesner, Jr. et al. ..................... 379/106 |
| 5,434,910 | 7/1995 | Johnson et al. ........................... 379/89 |
| 5,458,494 | 10/1995 | Krohn et al. ............................ 379/105 |
| 5,488,650 | 1/1996 | Greco et al. ............................... 379/89 |

*Primary Examiner*—Stella Woo
*Attorney, Agent, or Firm*—Staas & Halsey

[57] ABSTRACT

A data processing section controls a line connecting section, data transferring section, speech output section and console control section to process and input/output data for responding/reporting. The data processing section analyzes data received from the data base of a supervision and control system which is a connection object via the data transferring section, and effects a process according to the result of analysis, linkage information and message content set from the console via the console control section. The data processing section creates message data of a response message indicating the operating condition of the supervision and control system and supplies the same to the speech output section and supplies a speech message created in the speech output section to a public communication line via the line connecting section.

20 Claims, 15 Drawing Sheets

FIG. 4

| ITEM NUMBER | KEY NUMBER | | BIT POSITION | STATION NAME | ITEM NAME | PRESENT VALUE |
|---|---|---|---|---|---|---|
| | LEVEL | NUMBER | | | | |
| 5.1 | 5 | 1 | | KAWASAKI | AMOUNT OF RAINFALL PER HOUR | 10 |
| 5.2 | 5 | 2 | | KAWASAKI | ACCUMULATED AMOUNT OF RAINFALL | 50 |
| 6.1 | 6 | 1 | | KAWASAKI | TOTAL SUM IN ONE DAY OF AMOUNT OF RAINFALL PER HOUR | 100 |
| 6.2 | 6 | 2 | | KAWASAKI | AVERAGE IN ONE DAY OF AMOUNT OF RAINFALL PER HOUR | 8 |
| 6.3 | 6 | 3 | | KAWASAKI | MAXIMUM IN ONE DAY OF AMOUNT OF RAINFALL PER HOUR | 30 |

FIG. 5

| KEY NUMBER | | SPEECH SEGMENT NUMBER |
|---|---|---|
| LEVEL | NUMBER | |
| 5 | 1 | D0501 |
| 5 | 2 | D0502 |
| 6 | 1 | D0601 |
| 6 | 2 | D0602 |
| 6 | 3 | D0603 |
| 5 | 3 | D0503 |
| 6 | 4 | D0604 |
| 6 | 5 | D0605 |

| SPEECH SEGMENT NUMBER | SPEECH SEGMENT NAME | READING | SPEECH SEGMENT DATA |
|---|---|---|---|
| V0001 | 1 | ICHI | <RECORD DATA> |
| V0002 | 2 | NI | |
| ⋮ | ⋮ | ⋮ | |
| V0010 | 10 | JYUU | |
| ⋮ | | ⋮ | |
| V0500 | MEITORU | MEITORU | |
| V0501 | NAKAHARA-KYOKU-NO | NAKAHARA-KYOKU-NO | |
| V0502 | KOSUGI-KYOKU-NO | KOSUGI-KYOKU-NO | |
| V0503 | KAWASAKI-KYOKU-NO | KAWASAKI-KYOKU-NO | |
| V0504 | JIKAN-URYOU-WA | JIKAN-URYOU-WA | |
| V0505 | KONNICHI-WA | KONNICHI-WA | |
| V0506 | KOCHIRA-WA-EI-SHA | KOCHIRA-WA-EI-SHA | |
| V0507 | TADAIMA-NO | TADAIMA-NO | |
| V0508 | DESU | DESU | |
| V0509 | RUIKEI-URYOU-WA | RUIKEI-URYOU-WA | |
| V0510 | CHAIMU | CHAIMU | |
| V0511 | TADAIMA | TADAIMA | |
| V0512 | JIKAN-URYOU-GA | JIKAN-URYOU-GA | |
| V0513 | JYOUGENCHI-WO-KOE | JYOUGENCHI-WO-KOE | |
| V0514 | JIKAN-URYOU-JYOUGENCHI-WO | JIKAN-URYOU-JYOUGENCHI-WO | |
| V0515 | KOETE-IRU | KOETE-IRU | |
| V0516 | KYOKU-WA | KYOKU-WA | |
| ⋮ | ⋮ | ⋮ | |
| Y0401 | KAWASAKI | KAWASAKI | |
| Y0402 | NOBORITO | NOBORITO | |

```
┌─────────────────────────────────────────────┐
│            DATA LINKAGE                     │
│  ▼▶▶ ┌──────────┐  ┌─LINKAGE START (S)─┐ ┌─END (E)─┐
│      └──────────┘  └───────────────────┘ └─────────┘
│                                        ┌─HELP (H)─┐
│  ▼▶▶ ┌──────────┐   PLEASE SELECT.     └──────────┘
│      └──────────┘   ┌──────────────────────┐
│                     │ DATA TYPE (AMOUNT OF │
│  ▼▶▶ ┌──────────┐   │ RAINFALL)            │
│      └──────────┘   │ DATA TYPE (WATER     │
│                     │ LEVEL AND DISCHARGE) │
│  ▼▶▶ ┌──────────┐   │                      │
│      └──────────┘   │                      │
│                     │                      │
│                     └──────────────────────┘
│   ▶▶ ┌──────────┐   ┌─START OF DIRECT INPUT┐
│      └──────────┘   └──────────────────────┘
└─────────────────────────────────────────────┘
```

▼▶▶ DATA TYPE — AMOUNT OF RAINFALL
LINKAGE START (S) | END (E)

▼▶▶ TYPE OF ARITHMETIC OPERATION — EVERY HOUR ON THE HOUR

HELP (H)

PLEASE SELECT.
- KYOKU-MEI (KAWASAKI)
- KYOKU-MEI (NOBORITO)
- KYOKU-MEI (HOROKANAI)
- KYOKU-MEI (TAKADOMARI)
- KYOKU-MEI (SHOUWA)
- KYOKU-MEI (TADOSHI)
- KYOKU-MEI (ISHIYUZAWA)
- KYOKU-MEI (URYUUBASHI)
- KYOKU-MEI (NISHITOKUTOMI)
- KYOKU-MEI (NISITAPPU)

START OF DIRECT INPUT

FIG. 8

```
                    DATA LINKAGE

▼▶▶ DATA TYPE        LINKAGE START (S)   END (E)
   AMOUNT OF RAINFALL
      TYPE OF ARITHMETIC              HELP (H)
▼▶▶ OPERATION        PLEASE SELECT.
   EVERY HOUR ON THE  DEITA-KOUMOKU (JIKAN-URYOU)
   HOUR               DEITA-KOUMOKU (RUIKEI-URYOU)
▼▶▶ STATION NAME
   KAWASAKI

▼▶▶

▶▶
                     START OF DIRECT INPUT
```

FIG. 9

```
                    DATA LINKAGE

▼▶▶ DATA TYPE        LINKAGE START (S)   END (E)
   AMOUNT OF RAINFALL
      TYPE OF ARITHMETIC              HELP (H)
▼▶▶ OPERATION        DATA LINKAGE CAN BE OBTAINED.
   EVERY HOUR ON THE
   HOUR

▼▶▶ STATION NAME
   KAWASAKI

▼▶▶ DATA ITEM
   AMOUNT OF RAINFALL
   PER HOUR

▶▶
                     START OF DIRECT INPUT
```

FIG. 10

| RESPONSE MESSAGE EDITION | |
|---|---|

| PREVIOUS PAGE | NEXT PAGE | NAME REGISTRATION | SPEECH OUTPUT | ○ OVERWRITING | ◉ INSERTION |

NO. MESSAGE NAME | SPEECH SEGMENT TYPE
RESPONSE MESSAGE 1 | NO ATTRIBUTE

REPORT MESSAGE EDITING AREA

```
KONNICHIWA
KOCHIRA-WA-EI-SYA-DESU
TADAIMA-NO-DEITA-WO-OSHI
KAWASAKI-KYOKU-NO
JIKAN-URYOU-WA
KAWASAKI-JIKAN-URYOU
DESU
```

SPEECH SEGMENT TABLE

```
KONNICHIWA
KOCHIRA-WA-EI-SHA-DESU
TADAIMA-NO-SHUUSHUU-DE
KAWASAKI-JIKAN-URYOU
TEI-EMU-KANSOKU-JIKOKU (TUKU
TEI-EMU-KANSOKU-JIKOKU (HI
AISATSU
KAHEN
DAMU-SHORYOU-KANSOKU-JIKOKU
KAWASAKI-KYOKU-NO
NAKAHARA-KYOKU-NO
JIKAN-URYOU-WA
RUIKEI-URYOU-WA
```

FIG. 11

| RESPONSE MESSAGE NUMBER | SPEECH SEGMENT NUMBER |
|---|---|
| 1 | V0505 |
|  | V0506 |
|  | V0507 |
|  | V0503 |
|  | V0504 |
|  | V0501 |
|  | V0508 |

| REPORTING MESSAGE NUMBER | TELEPHONE NUMBER OF REPORTING DESTINATION | REPORT START BIT | SPEECH SEGMENT NUMBER |
|---|---|---|---|
| 1 | 044-794-3079 | REBERU-GO | V0506 |
|  |  | BANGOU-ICHI | V0511 |
|  |  | BITTO-ICHI | V0512 |
|  |  |  | V0513 |

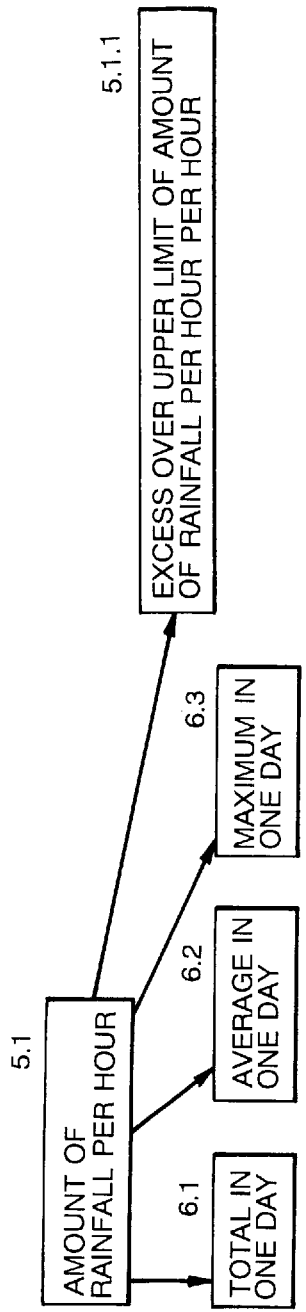

| GROUPING SPECIFYING POSITION | GROUPING BIT POSITION | SPEECH SEGMENT NUMBER | SPEECH SEGMENT NAME |
|---|---|---|---|
| LEVEL 3 NO. 1 | LEVEL 5 BIT 1 | X0301 | TABLE OF STATIONS FOR AMOUNT OF RAINFALL |

| KEY NUMBER | | ITEM NAME | SPEECH SEGMENT NUMBER |
|---|---|---|---|
| LEVEL | NUMBER | | |
| 4 | 1 | KAWASAKI | Y0401 |
| 4 | 2 | NOBORITO | Y0402 |

FIG. 22

| RESPONSE MESSAGE NUMBER | SPEECH SEGMENT NUMBER | SPEECH SEGMENT NAME |
|---|---|---|
| 1 | V0505 | KONICHI-WA |
| | V0506 | KOCHIRA-WA-EI-SHA-DESU |
| | V0511 | TADAIMA |
| | V0514 | JIKAN-URYOU-JYOUGENCHI-WO |
| | V0515 | KOETE-IRU |
| | V0516 | KYOKU-WA |
| | V0301 | URYOU-KYOKU-ICHIRAN |
| | V0508 | DESU |

FIG. 23

AUDIO RESPONSE/REPORT DEVICE

This application is a continuation, of application Ser. No. 08/346,279, filed Nov. 22, 1994, now abandoned.

BACKGROUND OF THE INVENTION

1. Field of the Invention

The present invention relates to an audio response/report device for automatically responding and/or reporting information indicating the condition of a system such as an instrumentation supervision and control system with a voice or speech by use of a public communication line, for example, telephone line.

2. Description of the Related Art

For example, in the instrumentation supervision and control system, an object system is sometimes supervised without any attended operator. In such a case, it is required to monitor the condition of the system from the remote place without requiring the operator to go to the place in which the object system is installed.

In order to meet the above requirement, an audio response/report device which makes it possible to get information on the condition of the object system with a speech via a telephone line from any one of telephones is provided. Such an audio response/report device is designed to automatically dial the number of a previously specified reporting destination to give information on the condition of the object system at the time of occurrence of abnormal condition.

Since the conventional audio response/report device is generally incorporated into the object system itself such as the instrumentation supervision and control system and thus additively provided in the object system, the object system is specified in many cases and a processing program for automatic response and report with a speech is discretely created for each object system. In such an audio response/report device, a speech message output for the response and report is determined by the processing program itself for each object system and the content and combination of the speech messages are fixedly created as part of the processing program individually for each object system.

In this case, the audio response/report device receives information related to specified data corresponding to the report and response content from the object system, constructs a speech message corresponding to the received information by the processing program and makes the response and report. Therefore, the object system itself is also designed to give data corresponding to the response and report content to the audio response/report device. Further, the reporting destination is set in the processing program for each object system.

Since the conventional audio response/report device described above fixedly sets the response and report content in the processing program, the content which can be responded and reported is limited to the standard or representative content irrespective of the data base held in the object system and lacks flexibility. Further, the response and report messages are limited and cannot be frequently changed according to the usage condition of the user. Therefore, when a response or report message is newly introduced or the response and report messages are added or modified, the processing program must be changed and the change will be made erroneously sometimes.

Further, the reporting destination in the system for effecting the automatic report is fixed in one place and the report content is limited.

SUMMARY OF THE INVENTION

An object of the present invention is to provide an audio response/report device which permits the user to set the response and report content in connection with a data base when necessary according to the usage condition and permits the response and report with a speech according to the intention of the user.

An audio response/report device according to a first aspect of the present invention comprises a data base; a console section on which an operator sets linkage information between the message content to be output with a speech and data on the data base to be converted into a message by use of a display plane; a data processing section for creating message data based on data of the data base and the set content on the console section; and a speech creating section for creating a speech message based on the message data created in the data processing section.

In the above audio response/report device, the console section includes a condition setting section for setting a reporting condition as linkage information and the device may further include a detecting section for detecting that data on the data base meets the reporting condition set by the condition setting section.

In the above audio response/report device, the console section includes a report information setting section for setting a reporting condition and a reporting destination corresponding to the reporting condition as linkage information and the device may further include a detecting section for detecting that data on the data base meets the reporting condition set by the report information setting section and a calling section for calling a reporting destination set by the report information setting section in response to a detection of the detecting section.

An audio response/report device according to a second aspect of the present invention comprises a communication processing section for transferring information with respect to an object system having a data base; a console section on which an operator sets linkage information between a message content to be output with a speech and data on the data base to be converted into a message by use of a display plane; a data processing section for creating message data based on data of the data base and the set content on the console section; and a speech creating section for creating a speech message based on the message data created in the data processing section.

In the above audio response/report device, the console section includes a condition setting section for setting a reporting condition as linkage information and the device may further include a detecting section for detecting that data on the data base extracted from the object system via the communication processing section meets the reporting condition set by the condition setting section.

In the above audio response/report device, the console section includes a report information setting section for setting a reporting condition and a reporting destination corresponding to the reporting condition as linkage information and the device may further include a detecting section for detecting that data on the data base extracted from the object system via the communication processing section meets the reporting condition set by the report information setting section and a calling section for calling a reporting destination set by the report information setting section in response to a detection of the detecting section.

Further, the condition setting section includes a section for setting a grouping information corresponding to the reporting condition as the linkage information and the data processing section may further include a data creating section for creating message data of a response message indicating the condition in the same group of the object system based on the grouping information and data extracted from the object system.

In the above audio response/report device according to the present invention, the operation of setting the message content to be responded with a speech and setting the linkage information with the data base is effected by operating the console section by the operator, data is analyzed by the data processing section according to the linkage information and message content set by the console section, message data of the response message indicating the condition of the system is created based on data extracted from the data base and is supplied to the speech creating section, and the speech message created by the speech creating section is output to the public communication line via a line connecting section, for example.

Therefore, in the audio response/report device, the response and report content can be set by the user when necessary according to the condition of usage and the response and report can be made by use of a speech according to the intention of the user.

Further, it is possible to set a plurality of reporting destinations and reporting conditions as the linkage information, and if a report is made according to the reporting destinations and reporting conditions, a report to the plurality of reporting destinations according to the reporting conditions can be made.

BRIEF DESCRIPTION OF THE DRAWINGS

Other objects and advantages of the invention will become apparent during the following discussion in conjunction with the accompanying drawings, in which:

FIG. 4 is a diagram diagrammatically showing an example of data associated with a DB linkage file of the audio response/report device of FIG. 1;

FIG. 5 is a diagram diagrammatically showing an example of data of a DB (data base) linkage file of the audio response/report device of FIG. 1;

FIG. 6 is a diagram diagrammatically showing an example of a speech segment file of the audio response/report device of FIG. 1;

FIG. 7 is a diagram diagrammatically showing an example of image display for illustrating the DB linkage file registering process of the audio response/report device of FIG. 1;

FIG. 8 is a diagram diagrammatically showing an example of image display for illustrating the DB linkage file registering process of the audio response/report device of FIG. 1;

FIG. 9 is a diagram diagrammatically showing an example of image display for illustrating the DB linkage file registering process of the audio response/report device of FIG. 1;

FIG. 10 is a diagram diagrammatically showing an example of image display for illustrating the DB linkage file registering process of the audio response/report device of FIG. 1;

FIG. 11 is a diagram diagrammatically showing an example of image display for illustrating the message registering process of the audio response/report device of FIG. 1;

FIG. 15 is a diagram diagrammatically showing an example of the structure of part of the data base of a system associated with the operation of the audio response/report device of FIG. 1;

FIG. 16 is a diagram diagrammatically showing an example of part of data associated with the DB linkage file of the audio response/report device of FIG. 1;

FIG. 22 is a diagram diagrammatically showing an example of a grouping item name list of the audio response/report device of FIG. 1;

FIG. 23 is a diagram diagrammatically showing an example of a response message file of the audio response/report device of FIG. 1.

DETAILED DESCRIPTION OF THE PREFERRED EMBODIMENT

There will now be described an embodiment of an audio response/report device according to the present invention with reference to the accompanying drawings.

Figure 1:
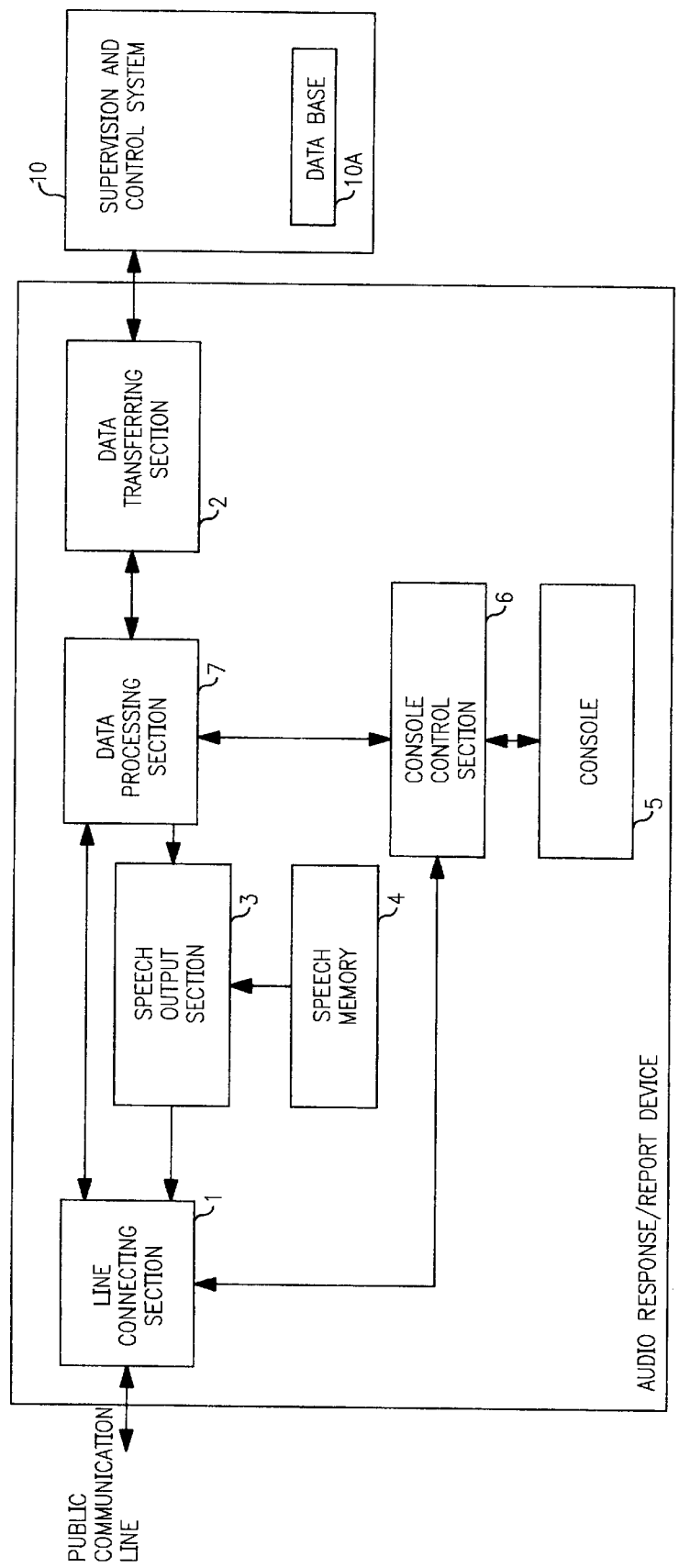
FIG. 1 is a block diagram showing the construction of one embodiment of an audio response/report device according to the present invention.

FIG. 1 shows the construction of an audio response/report device according to one embodiment of the present invention.

The audio response/report device of FIG. 1 includes a line connecting section 1, data transferring section 2, speech output section 3, speech memory 4, console 5, console control section 6 and data processing section 7.

The line connecting section 1 is a connection interface with a public communication line such as a telephone line, and effects the automatic call incoming at the time of response to a calling via the public communication line and effects the automatic call originating at the time of reporting to a preset telephone number via the public communication line. The line connecting section 1 has a switching function of generally connecting the public communication line to the data processing section 7 and connecting the public communication line to the console control section 6 when a switching signal for line switching using a tone signal such as a push phone signal is received, for example.

The data transferring section 2 is connected to an object system such as a supervision and control system 10 to transfer data with respect to the supervision and control system. Data received by the data transferring section 2 is analyzed by the data processing section 7. Data transmitted to the supervision and control system 10 is supplied from the data processing section 7 to the data transferring section 2. The data transferring section 2 constructs a communication processing section.

The speech output section 3 is operated according to the control of the data processing section 7 to extract necessary speech data from the speech memory 4 and output a speech signal to the line connecting section 1. The speech signal is output as it is from the line connecting section 1 to the public communication line and used for response or report. The speech memory 4 stores a speech segment file which is speech data. The speech output section 3 and speech memory 4 construct a speech creating section.

The console 5 is an input/output section for permitting the interactive operation by the operator. Linkage information between the data base 10A of the supervision and control system 10 and the message content for response/report with a speech is set via the console control section 6 by the console 5. The console control section 6 controls the operation and input/output of the console 5 for the interactive operation. That is, the message content and linkage information are set into the data processing section 7 via the console control section 6. The console control section 6 can effect the same setting operation as that attained by use of the console 5 by using a console such as a terminal device connected thereto via the public communication line instead of the console 5 when the line connecting section 1 connects the public communication line to the console control section 6 in response to a switching signal such as a preset tone signal for line switching as described before. In this case, the operator is specifically a person in charge of support such as a customer engineer (CE) of the maker of the system, a person in charge of support for users, or the like. The console 5 and console control section 6 construct a console section.

The data processing section 7 controls the line connecting section 1, data transferring section 2, speech output section 3 and console control section 6 to effect the data processing and input/output operation for response/report of this device. The data processing section 7 analyzes data received from the data base 10A of the supervision and control system 10 which is a connection object via the data transferring section 2 and effects the processes based on the result of analysis, and the message content and linkage information set via the console control section 6 from the console 5.

That is, the data processing section 7 analyzes data according to the message content and linkage information set by the console control section 6 and the console 5, creates message data of a response message indicating the condition of the supervision and control system 10 based on data extracted from the supervision and control system 10 via the data transferring section 2 and outputs the message data to the speech output section 3, and supplies a speech message created in the speech output section 3 to the public communication line via the line connecting section 1.

Next, more concrete examples of the concrete processes in the console 5, console control section 6 and data processing section 7 are explained.

The data processing section 7 is operated in response to a calling given from the public communication line via the line connecting section 1. That is, when receiving a calling, the data processing section 7 creates message data of a response message indicating the condition of the supervision and control system 10 based on data extracted from the supervision and control system 10 via the data transferring section 2 and outputs the message data to the speech output section 3, and supplies a speech message created in the speech output section 3 and speech memory 4 to the public communication line via the line connecting section 1.

The console 5 and console control section 6 can set the reporting condition as linkage information. In this case, the data processing section 7 checks whether or not data extracted from the supervision and control system 10 via the data transferring section 2 meets the above reporting condition. When it is detected that the data satisfies the reporting condition, the data processing section 7 creates message data of a response message indicating the condition of the supervision and control system 10 based on data extracted from the supervision and control system 10, outputs the message data to the speech output section 3, calls a preset reporting destination from the line connecting section 1, and supplies a speech message created in the speech output section 3 and speech memory 4 to the public communication line via the line connecting section 1.

The console 5 and console control section 6 can set a reporting destination corresponding to the reporting condition as linkage information. In this case, if it is detected that data extracted from the supervision and control system 10 via the data transferring section 2 meets the above reporting condition, the data processing section 7 creates message data of a response message indicating the condition of the supervision and control system 10, outputs the message data to the speech output section 3, calls the reporting destination corresponding to the reporting condition from the line connecting section 1, and supplies a speech message created in the speech output section 3 and speech memory 4 to the public communication line via the line connecting section 1.

The console 5 and console control section 6 can set grouping information corresponding to the reporting condition as linkage information. In this case, if it is detected that data extracted from the supervision and control system 10 via the data transferring section 2 satisfies the above reporting condition, the data processing section 7 creates message data of a response message indicating the condition of the same group of the supervision and control system 10 based on the grouping information and data extracted from the supervision and control system 10, outputs the message data to the speech output section 3, and supplies a speech message created in the speech output section 3 and speech memory 4 to the public communication line via the line connecting section 1.

Next, the operation of the audio response/report device of FIG. 1 is explained.

Figure 2:
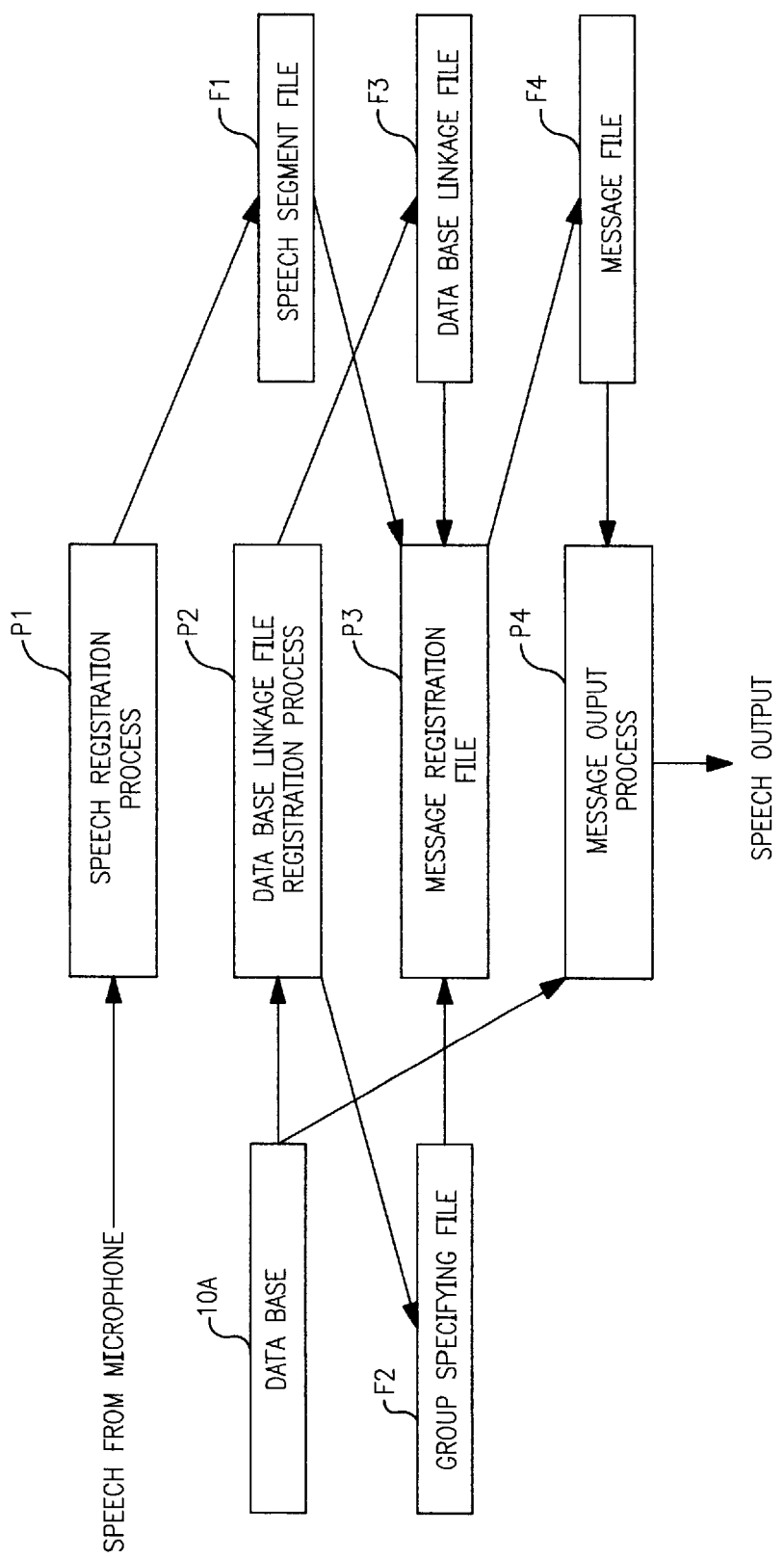
FIG. 2 is a data linkage diagram showing the entire process of the audio response/report device of FIG. 1.

FIG. 2 is a data linkage diagram showing the entire process of the audio response/report device of FIG. 1.

The process in the audio response/report device includes a speech registration process P1, DB linkage file registration process P2, message registration process P3 and message output process P4. The speech registration process P1, DB linkage file registration process P2, message registration process P3 and message output process P4 are basically independent processes and are not necessarily effected in a time-sequential manner. However, since the message registration process P3 uses a group specifying file F2 and DB linkage file F3 created or updated in the DB linkage file registration process P2, the message registration process P3 is effected after the DB linkage file registration process P2. Since the message output process P4 uses a message file F4 created or updated in the message registration process P3, the message output process P4 is effected after the message registration process P3. Since the DB linkage file registration process P2 and message output process P4 use a DB 10A of the supervision and control system 10 which is an object system, the processes are effected with the audio response/report device connected to the supervision and control system 10.

The speech registration process P1 creates a speech segment file F1 by using a microphone voice input via a microphone. The microphone voice can be directly input by connecting a microphone to the console 5, for example, or by reproducing a speech recorded on a magnetic tape or the like by use of a tape recorder, for example. The speech segment file F1 is stored in the speech memory 4.

The DB linkage file registration process P2 sets or updates group specifying information and DB linkage information for data of the DB 10A of the supervision and control system 10, creates or updates the group specifying file F2 of the group specifying information and DB linkage file F3 of the DB linkage information and stores them into a storing device (not shown) such as a memory in the data processing section 7.

The message registration process P3 uses speech segment information of the speech segment file F1, group specifying information of the group specifying file F2 and DB linkage information of the DB linkage file F3 to create or update message information and message file F4 and stores them into the storing device in the data processing section 7.

The message output process P4 uses data of the DB 10A and message information of the message file F4 to create message data of a response/report message and output the same as a speech signal to the public communication line via the line connecting section 1.

Figure 3:
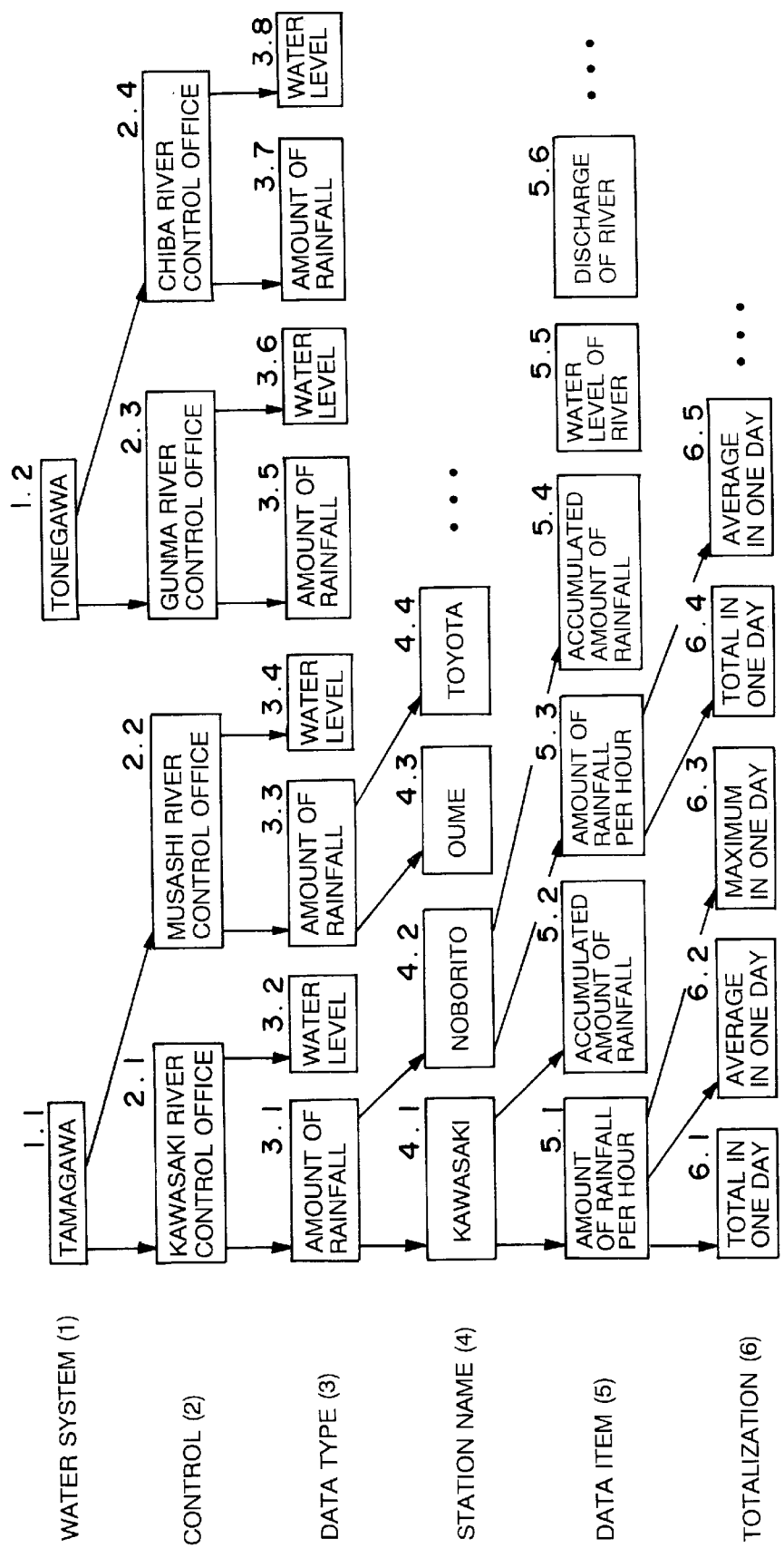
FIG. 3 is a diagram diagrammatically showing an example of the structure of data base of a system associated with the operation of the audio response/report device of FIG. 1.

FIG. 3 shows an example of the concrete structure of data base of the supervision and control system 10 in a case where the supervision and control system 10 is used for supervising a water system such as a river or the like, for example.

In the case of supervision of water system, the DB 10A includes items of water system (1), controlling office (2), data type (3), station name (4), data item (5) and totalization (6). The water system (1) indicates distinction of water systems of rivers such as "Tamagawa (river name)" (1.1) and "Tonegawa (river name)" (1.2), for example. The controlling office (2) indicates the controlling offices or the like for controlling respective portions of each water system, for example, items of "Kawasaki (place name)" river controlling office (2.1) and "Musashi (place name)" river controlling office (2.2) for "Tamagawa" (1.1) and "Gunma (place name)" river controlling office (2.3) and "Chiba (place name)" river controlling office (2.4) for "Tonegawa" (1.2).

The data type (3) indicates a type of data such as the amount of rainfall, water level and the like, for example, the amount of rainfall (3.1) and water level (3.2) in an area of the "Kawasaki" river controlling office (2.1) for "Tamagawa" (1.1), the amount of rainfall (3.3) and water level (3.4) in an area of the "Musashi" river controlling office (2.2) for "Tamagawa" (1.1), the amount of rainfall (3.5) and water level (3.6) in an area of the "Gunma" river controlling office (2.3) for "Tonegawa" (1.2), and the amount of rainfall (3.7) and water level (3.8) in an area of the "Chiba" river controlling office (2.4) for "Tonegawa" (1.2). The station name (4) indicates instrumentation stations for each data type (3), for example, "Kawasaki" (4.1) and "Noborito (place name)" (4.2) in the case of the amount of rainfall (3.1) in the area of the "Kawasaki" river controlling office (2.1) and "Oume (place name)" and "Toyota (place name)" in the case of the water level (3.2) in the area of the "Kawasaki" river controlling office (2.1).

The data item (5) indicates an item of arithmetic operation or totalization in each station, for example, the amount of rainfall per hour (5.1) and the accumulated amount of rainfall (5.2) in the case of "Kawasaki" (4.1) of the amount of rainfall (3.1), the amount of rainfall per hour (5.3) and the accumulated amount of rainfall (5.4) in the case of "Noborito" (4.2) of the amount of rainfall (3.1), and the river water level (5.5) and river flow rate (5.6) in the case of "Oume" (4.3) of the water level (3.2). The totalization (6) indicates distinction of the totalization when various totalization forms are provided in the data item (5), for example, the total sum per day (6.1), the average value in one day (6.2) and the maximum value in one day (6.3) for the amount of rainfall per hour (5.1), and the total sum per day (6.4) and the average value in one day (6.5) for the amount of rainfall per hour (5.3).

All of the data items of the DB 10A do not have data values and such items as the amount of rainfall per hour (5.1) and the total sum per day (6.1) of the amount of rainfall per hour have concrete data values. Those items which actually have values are used as DB linkage data and a concrete example thereof is shown in FIG. 4. In FIG. 4, a concrete data item number, key number, bit position, station name, item name and present value are shown. The item number indicates an item number attached to each item. The key number is constructed by a level and a number, and in this case, the level is an integral part of the item number and the number is a decimal part thereof.

As shown in FIG. 4, for example, in the case of item number 5.1, the level of the key number is 5, the number thereof is 1, no bit position data is present, the station name is "Kawasaki", the item name is the amount of rainfall per hour, and the present value is "10". Likewise, in the case of item number 5.2, the level of the key number is 5, the number thereof is 2, no bit position data is present, the station name is "Kawasaki", the item name is the accumulated amount of rainfall, and the present value is "50", in the case of item number 6.1, the level of the key number is 6, the number thereof is 1, no bit position data is present, the station name is "Kawasaki", the item name is the total sum per day of the amount of rainfall per hour, and the present value is "100", in the case of item number 6.2, the level of the key number is 6, the number thereof is 2, no bit position data is present, the station name is "Kawasaki", the item name is the average value in one day of the amount of rainfall per hour, and the present value is "8", and in the case of item number 6.3, the level of the key number is 6, the number thereof is 3, no bit position data is present, the station name is "Kawasaki", the item name is the maximum value in one day of the amount of rainfall per hour, and the present value is "30".

The relation between the data items having the values shown in FIG. 4 and speech segments is shown by the DB linkage file F3 used in the embodiment of the present invention and a concrete example thereof is shown in FIG. 5. In FIG. 5, the key numbers and speech segment numbers are shown. The key number is constructed by a level and a number and corresponds to the key number shown in FIG. 4. As shown in FIG. 5, for example, the item in which the level of the key number is "5" and the number thereof is "1" is the amount of rainfall per hour of the "Kawasaki" office as described above and corresponds to the speech segment number D0501.

Likewise, the item in which the level of the key number is "5" and the number thereof is "2" corresponds to the speech segment number D0502, the item in which the level of the key number is "6" and the number thereof is "1" corresponds to the speech segment number D0601, the item in which the level of the key number is "6" and the number thereof is "2" corresponds to the speech segment number D0602, the item in which the level of the key number is "6" and the number thereof is "3" corresponds to the speech segment number D0603, the item in which the level of the key number is "5" and the number thereof is "3" corresponds to the speech segment number D0503, the item in which the level of the key number is "6" and the number thereof is "4" corresponds to the speech segment number D0604, and the item in which the level of the key number is "6" and the number thereof is "5" corresponds to the speech segment number D0605.

Next, a concrete example of the speech segment file F1 used in the embodiment of the present invention is shown in FIG. 6. The speech segment file F1 shows the relation between the speech segment number and speech segment data, and in FIG. 6, the speech segment number, speech segment name, reading, and speech segment data are shown. The speech segment number shown in FIG. 6 indicates a speech segment number which is held by the speech segment data in a case where the head character thereof is "V" and indicates a speech segment number of a grouping item name which is held by the speech segment data in a case where the head character thereof is "Y". The speech segment number used in the data linkage file F3 shown in FIG. 5 indicates a value held by data at the present time when a speech is actually uttered and is not directly connected to the speech segment data so that "D" is attached to the head portion of the speech segment number.

As shown in FIG. 6, for example, the item whose speech segment number is V0001 corresponds to speech segment data in which the speech segment name is "1" and the reading is "ICHI (one)" and which is constructed by record data whose reading is "ICHI". Likewise, the item whose speech segment number is V0002 corresponds to speech segment data in which the speech segment name is "2" and the reading is "NI (two)" and which is constructed by record data whose reading is "NI", and the item whose speech segment number is V0010 corresponds to speech segment data in which the speech segment name is "10" and the reading is "JYUU (ten)" and which is constructed by record data whose reading is "JYUU".

Further, the item whose speech segment number is V0500 corresponds to speech segment data in which the speech segment name is "m" and the reading is "MEITORU (meter)" and which is constructed by record data whose reading is "MEITORU". The item whose speech segment number is V0501 corresponds to speech segment data in which the speech segment name is "Japanese character string J1 meaning 'of the Nakahara station'" and the reading is "NAKAHARA-KYOKU-NO (of the Nakahara station)" and which is constructed by record data whose reading is "NAKAHARA-KYOKU-NO", the item whose speech segment number is V0502 corresponds to speech segment data in which the speech segment name is "Japanese character string J2 meaning 'of the Kosugi station'" and the reading is "KOSUGI-KYOKU-NO" and which is constructed by record data whose reading is "KOSUGI-KYOKU-NO", the item whose speech segment number is V0503 corresponds to speech segment data in which the speech segment name is "Japanese character string J3 meaning 'of the Kawasaki station'" and the reading is "KAWASAKI-KYOKU-NO" and which is constructed by record data whose reading is "KAWASAKI-KYOKU-NO", the item whose speech segment number is V0504 corresponds to speech segment data in which the speech segment name is "Japanese character string J4 meaning 'the amount of rainfall per hour . . . '" and the reading is "JIKAN-URYOU-WA (the amount of rainfall per hour . . . )" and which is constructed by record data whose reading is "JIKAN-URYOU-WA".

The item whose speech segment number is V0505 corresponds to speech segment data in which the speech segment name is "Japanese character string J5 meaning 'Good day!'" and the reading is "KONNICHI-WA (Good day !)" and which is constructed by record data whose reading is "KONNICHI-WA", the item whose speech segment number is V0506 corresponds to speech segment data in which the speech segment name is "Japanese character string J6 meaning 'this is A Co. . . . '" and the reading is "KOCHIRA-WA-EI-SHA . . . (this is "A" Co. . . . )" and which is constructed by record data whose reading is "KOCHIRA-WA-EI-SHA . . . ", the item whose speech segment number is V0507 corresponds to speech segment data in which the speech segment name is "Japanese character string J7 meaning 'at present'" and the reading is "TADAIMA-NO (at present)" and which is constructed by record data whose reading is "TADAIMA-NO", the item whose speech segment number is V0508 corresponds to speech segment data in which the speech segment name is "Japanese character string J8 meaning 'is'" and the reading is "DESU (is)" and which is constructed by record data whose reading is "DESU", and the item whose speech segment number is V0509 corresponds to speech segment data in which the speech segment name is "Japanese character string J9 meaning 'the accumulated amount of rainfall . . . '" and the reading is "RUIKEI-URYOU-WA (the accumulated amount of rainfall . . . )" and which is constructed by record data whose reading is "RUIKEI-URYOU-WA".

The item whose speech segment number is V0510 corresponds to speech segment data in which the speech segment name is "Japanese character string J10 meaning 'chime'" and the reading is "a real sound of a chime (which is not a so-called reading but is a chime sound itself)" and which is constructed by speech data of a chime sound. The item whose speech segment number is V0511 corresponds to speech segment data in which the speech segment name is "Japanese character string J11 meaning 'now'" and the reading is "TADAIMA (now)" and which is constructed by record data whose reading is "TADAIMA", the item whose speech segment number is V0512 corresponds to speech segment data in which the speech segment name is "Japanese character string J12 meaning 'the amount of rainfall per hour . . . '" and the reading is "JIKAN-URYOU-GA (the amount of rainfall per hour . . . )" and which is constructed by record data whose reading is "JIKAN-URYOU-GA", and the item whose speech segment number is V0513 corresponds to speech segment data in which the speech segment name is "Japanese character string J13 meaning 'exceeds an upper limit value'" and the reading is "JOUGENCHI-WO-KOE . . . (exceeds an upper limit value)" and which is constructed by record data whose reading is "JOUGENCHI-WO-KOE . . . ".

The item whose speech segment number is V0514 corresponds to speech segment data in which the speech segment name is "Japanese character string J14 meaning '... an upper limit value of the amount of rainfall per hour'" and the reading is "JIKAN-URYOU-JOUGENCHI-WO (... an upper limit value of the amount of rainfall per hour)" and which is constructed by record data whose reading is "JIKAN-URYOU-JOUGENCHI-WO", the item whose speech segment number is V0515 corresponds to speech segment data in which the speech segment name is "Japanese character string J15 meaning 'exceeds'" and the reading is "KOETE-IRU (exceeds)" and which is constructed by record data whose reading is "KOETE-IRU", the item whose speech segment number is V0516 corresponds to speech segment data in which the speech segment name is "Japanese character string J16 meaning 'the station ...'" and the reading is "KYOKU-WA (the station ...)" and which is constructed by record data whose reading is "KYOKU-WA".

Further, the item whose speech segment number is Y0401 corresponds to speech segment data in which the speech segment name is "Japanese character string J17 meaning 'Kawasaki'" and the reading is "KAWASAKI (name of place)" and which is constructed by record data whose reading is "KAWASAKI", and the item whose speech segment number is Y0402 corresponds to speech segment data in which the speech segment name is "Japanese character string J18 meaning 'Noborito'" and the reading is "NOBORITO (name of place)" and which is constructed by record data whose reading is "NOBORITO".

In the speech registration process P1, the speech segment name and reading are registered for each speech segment number as shown in FIG. 6 and the speech file F1 shown in FIG. 6 is created by registering corresponding record data as speech data by a speech input via a microphone. The speech segment file F1 is typically stored in the speech memory 4. The speech registration process P1 is effected by the interactive operation by the operator via the console 5. Further, it is possible to previously effect the speech registration process P1 at the time of system construction of the audio response/report device and store speech segment data in the speech memory 4 or the like.

Next, the DB linkage file registration process P2 shown in FIG. 2 is explained. In the DB linkage file registration process P2, the DB linkage file F3 and the group specifying file F2 if it is necessary are created based on the DB 10A of the supervision and control system 10 by the interactive operation by the operator via the console 5. The display plane of the console 5 in the DB linkage file registration process P2 is shown in FIGS. 7 to 10.

When the DB linkage file registration process P2 is started, the data type selection image plane as shown in FIG. 7 is displayed and the operator is urged to select a data type. In this case, as the data type, an item of data type (3) is extracted and, for example, "the data type (the amount of rainfall)" and "the data type (water level and discharge)" are displayed. A desired one of the displayed data types is selected and, for example, if "the amount of rainfall" is desired, "the data type (the amount of rainfall)" is selected. If the data type is selected, the arithmetic operation type such as "every hour on the hour" (at exactly the full hour) and "preset time" (for every 10, 15 or 30 minutes) is selected in substantially the same manner.

If the "every hour on the hour" is selected as the arithmetic operation type, the station name selecting image plane shown in FIG. 8 is obtained and the operator is urged to select the station name. In this case, as the station name, the item of the station name (4) is extracted from the DB 10A and, for example, "station name (Kawasaki)", "station name (Noborito)" and "station name (Horokanai)" are displayed. A desired one of the displayed station names, for example, "station name (Kawasaki)" is selected if "Kawasaki" is desired.

If the station name is selected, the data item selecting image plane shown in FIG. 9 is obtained and the operator is urged to select the data item of arithmetic operation or totalization. In this case, as the data item, the data item (5) is extracted from the DB 10A and, for example, "data item (the amount of rainfall per hour)", "data item (the accumulated amount of rain fall" and the like are displayed. A desired one of the displayed data items of arithmetic operation and totalization, for example, the "data item (the amount of rainfall per hour)" is selected if the amount of rainfall per hour is desired. When the data item of arithmetic operation or totalization is selected, an image plane shown in FIG. 10 is obtained, and the data linkage between the data type: the amount of rainfall, arithmetic operation type: every hour on the hour, station name: Kawasaki, and data item: the amount of rainfall per hour can be attained. Thus, the DB linkage file F3 having the contents as shown in FIGS. 4 and 5 is created.

Next, the message registration process P3 shown in FIG. 2 is explained. In the message registration process P3, the message file F4 is created by use of the speech segment file F1, DB linkage file F3 and the group specifying file F2 if it is necessary by the interactive operation by the operator via the console 5.

The response message editing image plane of the message registration process P3 is shown in FIG. 11. In the image plane in FIG. 11, as the number and name of the response message previously registered by the name registering operation, "response message 1" is displayed, and as the speech segment type, "no attribute" is displayed. Further, the speech segment list is displayed on the columns of a speech segment table on the right side of the image plane and messages constructed by selected speech segments are displayed in the response message editing area on the left side of the image plane. In the speech segment table, a speech segment list described in the speech segment file F1 and DB linkage file F3 is displayed. When speech segments necessary for constructing a message from the speech segment table are selected, the selected speech segments are sequentially arranged on the response message editing area on the left side. Only the names of the speech segments are displayed in the response message editing area on the image plane of FIG. 11, but at the time of storage of the thus edited result, a speech segment number corresponding to the name of each speech segment is stored in the message file F4.

Figures 12, 17, 19:
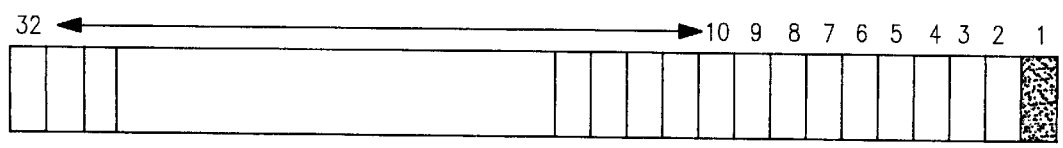
FIG. 12 is a diagram diagrammatically showing an example of a response message file of the audio response/report device of FIG. 1.
FIG. 17 is a diagram diagrammatically showing an example of the response message file of the audio response/report device of FIG. 1.
FIG. 19 is a diagram diagrammatically showing the format of a flag portion of data having a value of the data base of the audio response/report device of FIG. 1.

The content of the message file of the response message is shown in FIG. 12. In FIG. 12, as the response message number "1", that is, "response message 1" described above, the list of speech segment numbers is stored. In this case, the list of the speech segment numbers is "V0505", "0506", "V0507", "V0503", "V0504", "D0501", and "V0508". Speech segments corresponding to the speech segment numbers "V0505", "V0506", "V0507", "V0503", "V0504", and "V0508" are respectively "KONNICHI WA (Good day !)", "KOCHIRA WA 'A' SHA DESU (this is "A" Co.)", "TADAIMA NO SHUUSHUU DEITA WO OSHIRASE SHIMASU (the collected data at present is announced)", "KAWASAKI KYOKU NO (of Kawasaki station)", "JIKAN URYOU WA (the amount of rainfall per hour ...)", and "DESU (is)". Further, as is understood from FIGS. 5 and 4, the speech segment number "D0501" corresponds to the value of the amount of rainfall per hour of Kawasaki station, for example, "10". The speech segment number "D0501" is displayed as "<the amount of rainfall per hour in Kawasaki>" in the speech segment table and the response message of the response message editing area.

Therefore, the response message file of FIG. 12 becomes "KONNICHI WA (Good day !)", "KOCHIRA WA 'A' SHA DESU (this is "A" Co.)", "TADAIMA NO SHUUSHUU DEITA WO OSHIRASE SHIMASU (the collected data at present is announced)", "KAWASAKI KYOKU NO (of Kawasaki station)", "JIKAN URYOU WA (the amount of rainfall per hour . . . )", "<the value of the amount of rainfall per hour in Kawasaki>" and "DESU (is)", and becomes equal to the response message displayed in the response message editing area.

As in the case of the amount of rainfall per hour of Kawasaki station corresponding to the speech segment number "D0501", the format of data having a value among the DB 10A is constructed by a 32-bit flag portion and a data portion of 8 digits in BCD (binary-coded decimal) (one BCD digit is expressed by four bits).

Next, the message output process P4 shown in FIG. 2 is explained. The message output process P4 includes the audio response of a response message for automatically responding with a speech when call incoming is made by dialing from the exterior via the public communication line and the audio report of a report message for detecting a flag of condition previously set by the interactive operation by the operator via the console 5, automatically dialing the number of a previously set reporting destination and thus reporting with a speech. The report message can be registered in the same manner as the response message. Further, when the grouping is specified, the response or report of the condition of the group is made.

Figures 13, 14:
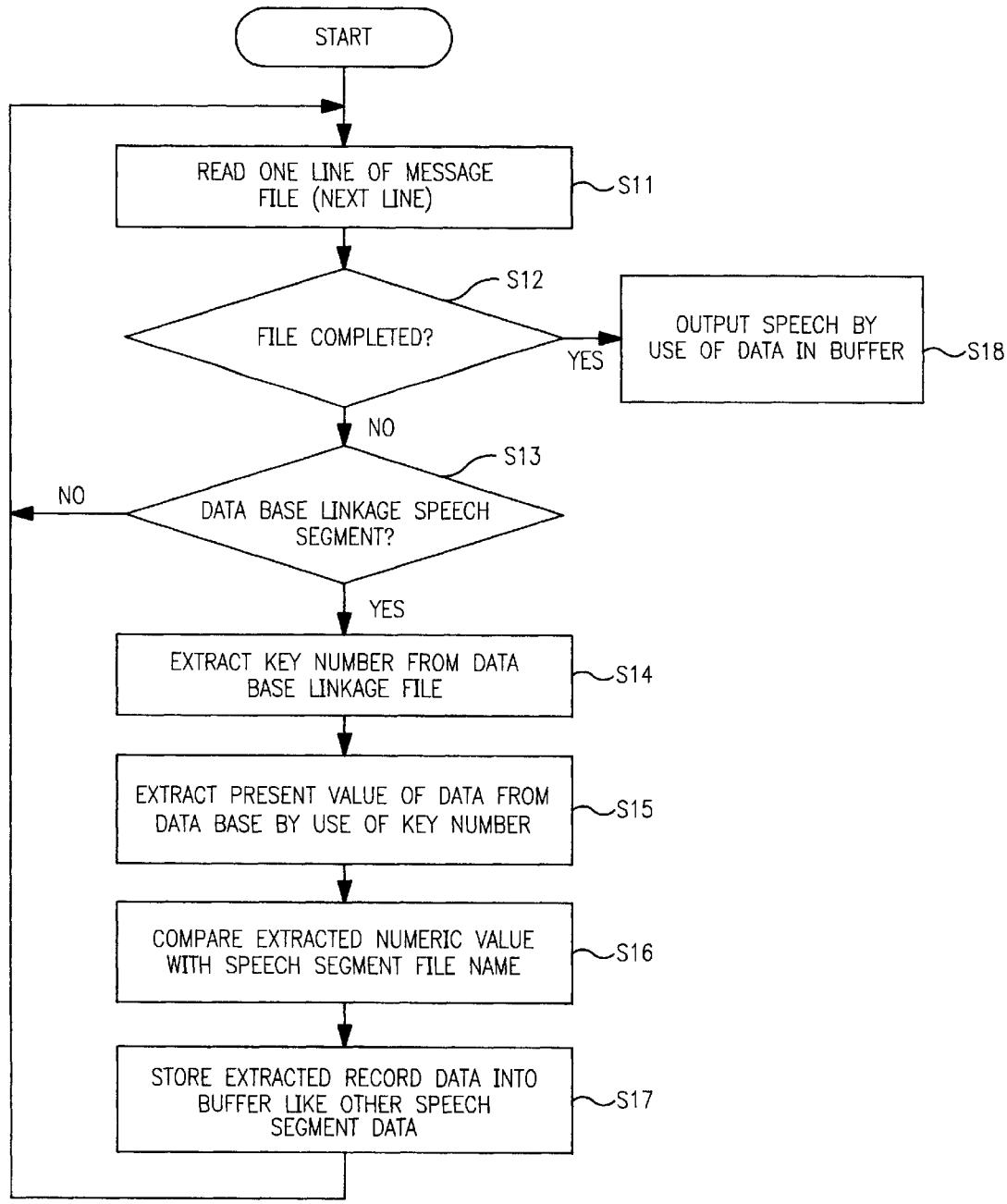
FIG. 13 is a diagram diagrammatically showing the format of data holding a value of the data base of the audio response/report device of FIG. 1.
FIG. 14 is a flowchart for illustrating the speech message output process of the audio response/report device of FIG. 1.

The flowchart of the speech output process for generating a speech output of data linkage is shown in FIG. 14. At the time of audio response, the process of FIG. 14 is effected as it is to make a response when a call is made by dialing. The operation is explained by taking an example of the response message explained with reference to FIG. 12 as a message is explained.

In FIG. 14, when the process is started, a message of one line is first read out from the message file F4 (step S11). Next, whether the message file is already completed or not is determined (step S12). If it is not completed, whether or not it is a DB linkage speech segment whose linkage is registered by the DB linkage file F3 is determined (step S13). Whether it is the DB linkage speech segment or not is determined based on the first digit of the speech segment number. In this case, if the first digit of the speech segment number is "D" as in the speech segment number "D0501", it is determined to be the DB linkage speech segment, and if the first digit of the speech segment number is not "D", it is determined not to be the DB linkage speech segment. If it is determined in the step S13 that it is not the DB linkage speech segment, speech segment data corresponding to the readout message of one line is stored into a buffer and then the process is returned to the step S11 to read out a message of next line from the message file F4.

If it is determined in the step S13 that the first digit of the speech segment number is "D" and it is the DB linkage speech segment, the DB linkage file F3 is referred to so as to extract a corresponding key number (constructed by a level and a number) (step S14). For example, if the speech segment number is "D0501", the level of the key number is "5" and the number thereof is "1". By use of the key number, the present value of the corresponding data is derived from the DB 10A (step S15). For example, if the present value of the amount of rainfall of Kawasaki station in which the key number has a level "5" and a number "1" is "10" as shown in FIG. 4, the value is extracted.

Next, the extracted value and the speech segment name (refer to FIG. 6) of the speech segment file F1 are compared with each other to extract record data which is speech segment data of a speech segment determined to coincide (step S16). For example, record data of the speech segment name which coincides with the value "10" is speech segment data having a speech segment number "V0010" and the record data is extracted. The record data of the extracted speech segment is stored in the buffer like the other speech segment data (step S17).

If it is determined in the step S12 that the message file is already completed, speech segment data items stored into the buffer so far are sequentially output as speech signals and the response of message with a speech of "KONNICHI WA-KOCHIRA WA 'A' SHA DESU-TADAIMA NO SHUUSHUU DEITA WO OSHIRASE SHIMASU-KAWASAKI KYOKU NO-JIKAN URYOU WA-JYUU (MIRIMEITORU)-DESU (Good day ! This is "A" Co. Collected data at present is announced. The amount of rainfall per hour of Kawasaki station is 10 mm)" is made (step S18).

Next, the audio report of report message in the message output process P4 is explained. The report is a function of detecting the condition of a flag attached to data and automatically dialing the number of a preset reporting destination so as to make a report with a speech.

In order to explain the DB linkage of this case, the structure of a necessary portion of the DB 10A is shown in FIG. 15. In FIG. 15, an item of an excess over the upper limit of the amount of rainfall per hour (5.1.1) is indicated in the term of the amount of rainfall per hour of the data item (5) with the structure of the DB 10A of FIG. 3. The above item is previously provided in the DB 10A. Like the DB linkage data shown in FIG. 4, for example, as shown in FIG. 16, the DB linkage data obtained at this time has a term number 5.1.1. the key number has a level "5", number "1" and bit position "1", the station name is Kawasaki, the item name is an excess over the upper limit of the amount of rainfall per hour, and the present value thereof is "1" (the present value in this case is one type of flag indicating "an excess over the upper limit of the amount of rainfall per hour" and is set to "0" when the condition is not "excess over the upper limit of the amount of rainfall per hour" and set to "1" at the time of "excess over the upper limit of the amount of rainfall per hour").

Unlike the case of FIG. 12, in this case, the message file F4 for reporting is constructed by "reporting message number", "reporting destination telephone number", "report starting bit" and "speech segment number" as shown in FIG. 17. Since the message file F4 for response shown in FIG. 12 as described before is constructed only by "response message number" and "speech segment number", the "reporting message number" is used instead of the "response message number" and the "reporting destination telephone number" and "report starting bit" are additionally provided in the case of reporting.

Figure 18:
FIG. 18 is a diagram diagrammatically showing an example of image display for illustrating the message registering process of the audio response/report device of FIG. 1.

That is, in the message file F4 for reporting shown in FIG. 17, the "reporting message number" is "1", the "reporting destination telephone number" is "044-794-3079", the "report starting bit" is "level of 5, number of 1 and bit position of 1", and the "speech segment numbers" are "V0506", "V0511", "V0512" and "V0513". The speech segment numbers correspond to the speech segment file F1 shown in FIG. 6, and the speech segment names corresponding to the speech segment numbers "V0506", "V0511", "V0512" and "V0513" are respectively "KOCHIRA WA EI SHA DESU (this is "A" Co.)", "TADAIMA (at present)", "JIKAN URYOU GA (the amount of rainfall . . . )" and "JOUGENCHI WO KOEMASHITA (has exceeded the upper limit)". Therefore, the content of the reporting message becomes "KOCHIRA WA EI SHA DESU-TADAIMA-JIKAN URYOU GA-JOUGENCHI WO KOEMASHITA (This is "A" Co. At present, the amount of rainfall per hour has exceeded the upper limit)" as indicated in the report message editing area of the report message editing image plane shown in FIG. 18.

Next, the operation of issuing a report message according to the value of the flag of the excess over the upper limit of the amount of rainfall per hour of the term number 5.1.1 of the DB 10A is explained. The format of data having a value of the DB 10A is constructed by the 32-bit flag portion and the BCD 8-digit (8×4-bit), that is, 32-bit data portion as shown in FIG. 13. Since the flag of the term number 5.1.1, that is, the flag of the excess over the upper limit of the amount of rainfall in Kawasaki of the level "5" and number "1" is the bit position "1", a flag is stored in the bit position "1" (the rightmost bit in the drawing) of the 32-bit flag portion of the amount of rainfall in Kawasaki of the level "5" and number "1" as shown in FIG. 19. As shown in FIG. 19, the present value of the flag is "1" (indicating the excess over the upper limit).

Figures 20, 21:
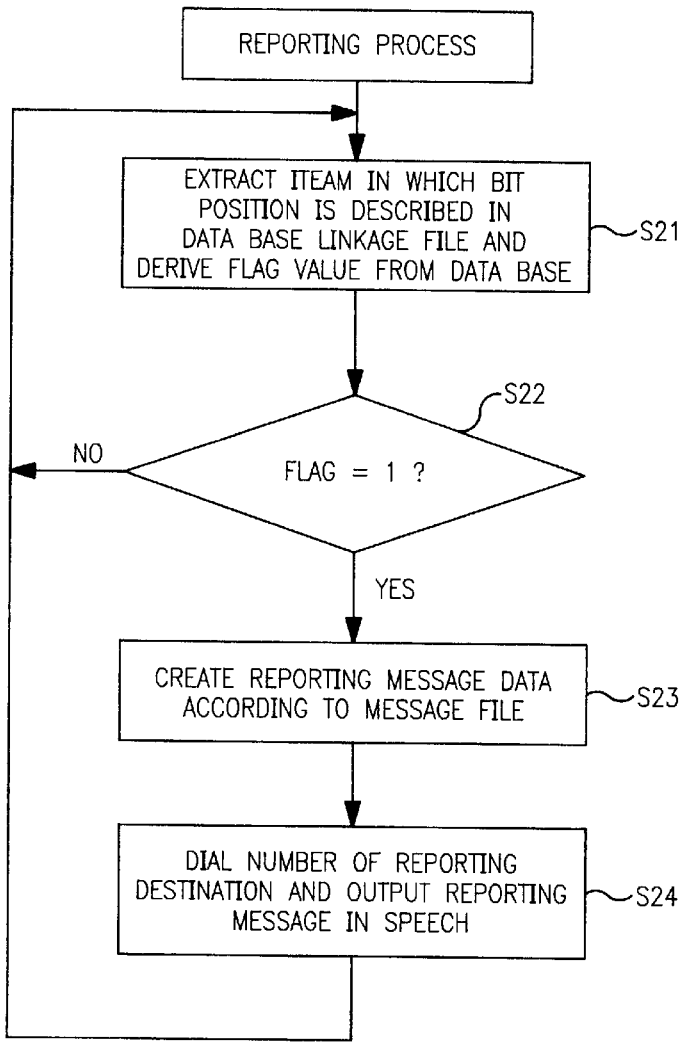
FIG. 20 is a flowchart for illustrating the reporting process of the audio response/report device of FIG. 1.
FIG. 21 is a diagram diagrammatically showing an example of a group specifying file of the audio response/report device of FIG. 1.

The flowchart showing the operation of the reporting process for report message output effected at this time is shown in FIG. 20. The reporting process repeatedly effects the operation at every preset time in order to make a report in response to a variation in corresponding flag information contained in data of the DB 10A.

When the process is started, an item in which information of bit position is written is extracted from the DB linkage file F3 and the present flag value of a corresponding item is extracted from the DB 10A (step S21). Whether the extracted flag value is "1" or not is determined (step S22), and if the flag value is not "1" (if it is "0"), the process is returned to the step S21 and the flag value extracting operation is effected again.

If it is detected in the step S22 that the flag value is "1", speech segment data of the report message is created according to the message file F4 in substantially the same manner as in the case of the response message (FIG. 14) and is stored into the buffer (step S23). Then, the reporting destination telephone number registered in the message file F4 of FIG. 17 is dialed from the line connecting section 1, and if it is connected to the destination, the report message in the buffer is output with a speech (step S24).

Next, a case wherein data in the DB 10A is grouped and a response on the condition of the group is made is explained. The specification of grouping is effected in connection with the registration of the DB linkage file and stored in the group specifying file F2. The grouping specifying file F2 is constructed by grouping specifying information shown in FIG. 21 and a grouping item name list shown in FIG. 22.

The grouping specifying information shown in FIG. 21 is constructed by "grouping specifying position", "grouping bit position", "speech segment number", and "speech segment name". In FIG. 21, for example, a case wherein the "grouping specifying position" has a level 3 and number 1, the "grouping bit position" has a level 5 and bit 1, the "speech segment number" is "X0301", and the "speech segment name" is "a table of stations for the amount of rainfall" is shown.

The grouping item name list shown in FIG. 22 is constructed by a "key number" including a level and a number, "item name" and "speech segment number". In the case of FIG. 22, for example, data having a level 4, number 1, item name "Kawasaki", and speech segment number of "Y0401" and data having a level 4, number 2, item name "Noborito", and speech segment number of "Y0402" are registered.

The content of the message file F4 of the response message at this time is shown in FIG. 23. The response message of FIG. 23 is constructed only by the "response message number" and "speech segment number" like the case of FIG. 12.

That is, the message file F4 of FIG. 23 has the "response message number" of "1" and "speech segment numbers" of "V0505", "V0506", "V0511", "V0514", "V0515", "V0516", "X0301" and "X0508". The speech segment numbers correspond to the speech segment file F1 shown in FIG. 6 and speech segment names corresponding to the speech segment numbers "V0505", "V0506", "V0511", "V0514", "V0515", "V0516" and "V0508" are respectively "KONNICHI WA (Good day !)", "KOCHIRA WA 'A' SHA DESU (this is "A" Co.)", "TADAIMA" (now)", "JIKAN URYOU JOUGENCHI WO (. . . the upper limit of the amount of rainfall per hour)", "KOETE IRU (exceeds)", "KYOKU WA (the station . . . )", and "DESU (is)". The speech segment number "X0301" is "a table of stations for the amount of rainfall" as shown in FIG. 21 and is a corresponding one of "Kawasaki" of the speech segment number "Y0401" and "Noborito" of the speech segment number "Y0402", for example.

Figure 24:
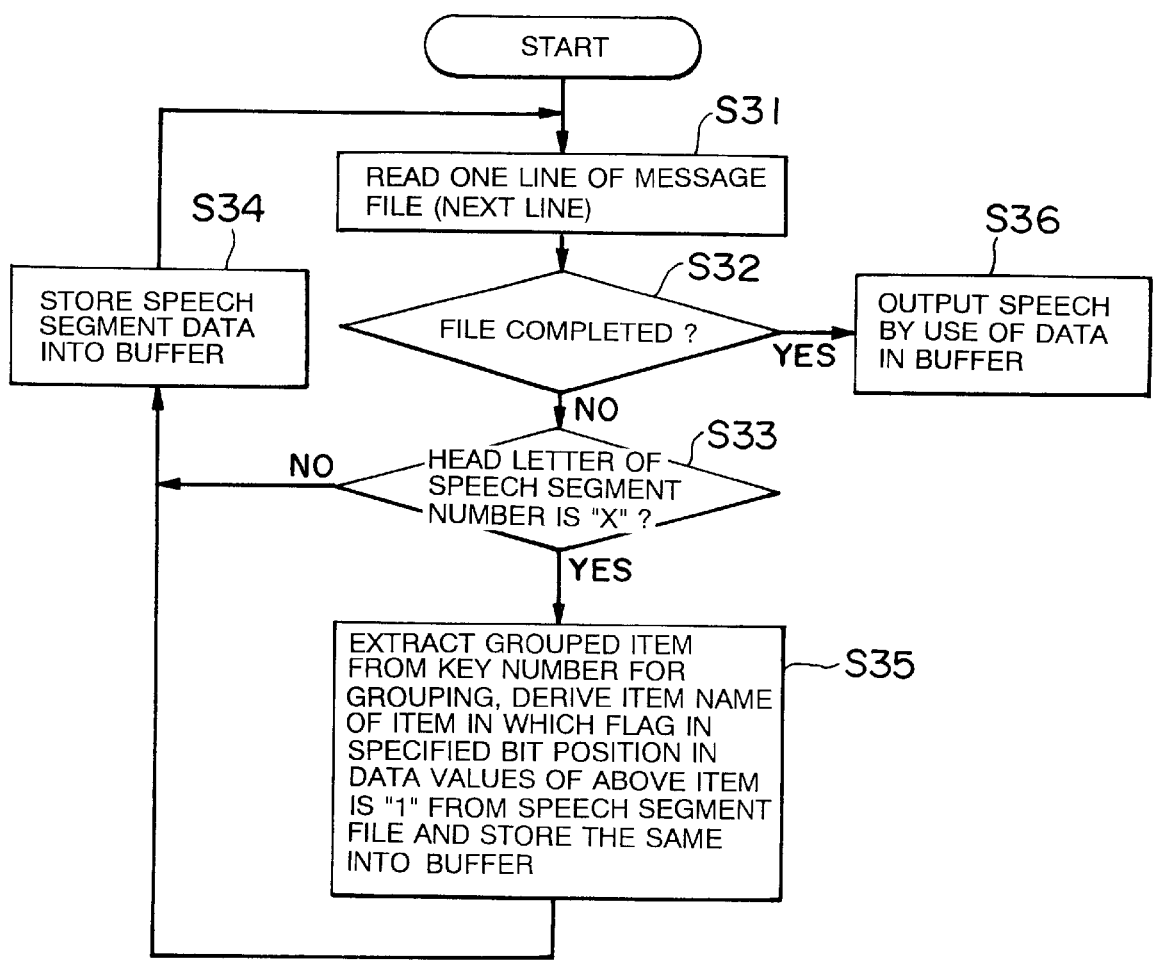
FIG. 24 is a flowchart for illustrating the speech message output process of the audio response/report device of FIG. 1.

Next, the operation of generating a response message at the time of grouping specification is explained. The flowchart of the operation of the response process for response message output effected at this time is shown in FIG. 24. Since the process is also related to the response, the audio response of a response message for automatically responding is effected with a speech when call incoming is made by dialing from the exterior via the public communication line. That is, when a call is made by dialing, the process shown in FIG. 24 is effected to respond.

If the process in FIG. 24 is started, a message corresponding to one line of the response message is first read out from the message file F4 (step S31). Then, whether the message file is already completed or not is determined (step S32). If it is not completed, whether or not it is a speech segment which is specified for grouping by the group specifying file F2 is determined (step S33). Whether it is the speech segment which is specified for grouping or not is determined based on the first digit of the speech segment number. In this case, if the first digit of the speech segment number is "X" as in the speech segment number "X0301", it is determined to be a speech segment which is specified for grouping, and if the first digit of the speech segment number is not "X", it is determined not to be a speech segment which is specified for grouping. If it is determined in the step S33 that it is not the speech segment which is specified for grouping, speech segment data corresponding to the readout message of one line is stored into a buffer (step S34) and then the process is returned to the step S31 to read out a message of next line from the message file F4.

If it is determined in the step S33 that the first digit of the speech segment number is "X" and it is a speech segment which is specified for grouping, grouped items are extracted from the key number for grouping in the group specifying file F2, the item name of an item in which the flag in the bit position specified among the data values of the items is "1" is extracted from the speech segment file and stored into the buffer (step S35), and the process goes to the step S34.

In this case, the amount of rainfall of Kawasaki river control office having a level "3" and a number "1" is specified for grouping and the item has Kawasaki station and Noborito station as the followers thereof. The item name in which the value of the bit 1 (bit position "1") of the level 5 for specifying the grouping bit position among data items of the above stations is "1", that is, the speech segment number of the station name is extracted from the grouping item name list of FIG. 22 and speech segment data corresponding to the speech segment number is extracted from the speech segment file F1 and stored into the buffer. When a group is made, one bit position has the common meaning in the group. For example, the bit position "1" (bit 1) is used to indicate an excess of the upper limit of the amount of rainfall per hour, and the bit position "2" (bit 2) is used to indicate an excess of the upper limit of the accumulated amount of rainfall.

When it is determined in the step S32 that the message file is already completed, speech segment data items stored into the buffer so far are sequentially output as speech signals so as to make a response of message with a speech (step S36). In this case, the content of the response message becomes "KONNICHI WA-KOCHIRA WA 'A' SHA DESU-TADAIMA-JIKAN URYOU JOUGENCHI WO-KOETE IRU-KYOKU WA-KAWASAKI·NOBORITO-DESU (Good day ! This is "A" Co. The station in which the upper limit of the amount of rainfall per hour is exceeded now is Kawasaki·Noborito)".

Thus, the conditions of the specified flags of the grouped items are checked and a response can be made with corresponding items collected in one group.

Even when the items are grouped as described above, a response can be automatically made based on the content of a previously specified flag in the same manner as in the case of discrete response described before.

In the audio response/report device of the present invention, the message content for response with a speech is set and linkage information with the data base is set by operating the console by the operator, data is analyzed by the data processing section based on the message content and linkage information set by the console section, message data of a response message indicating the condition of the system is created based on data extracted from the data base and supplied to the speech creating section, and a speech message created by the speech creating section is supplied to the public communication line via the line connecting section, for example, and thus output. Therefore, with the audio response/report device, the user can set the content of the response/report according to the usage condition when desired and make a response/report with a speech according to the intention of the user.

Further, if a plurality of reporting destinations and reporting conditions are set as the linkage information and a report is made according to the thus set contents, the report can be made to the plurality of reporting destinations according to the reporting conditions.

The audio response/report device according to the resent invention can be constructed to have all of the above-described various functions, but can also be constructed to include at least part of the above functions.

It is apparent that, in the present invention, a wide range of different working modes can be formed based on the invention without deviating from the spirit and scope of the invention.

What is claimed is:

1. An audio response/report device comprising:
   a data base storing data, which includes data items to be converted into a message, with respect to an object system;
   a memory storing a speech segment file containing speech segment information;
   a storing device storing a message file containing a message content to be output with a speech signal, and a data base linkage file containing linkage information between the data items within said data base and between the data items in said data base and the message content to be converted into the message;
   a console section on which an operator creates and updates, by use of a display plane, the message file and said data base linkage file;
   a data processing section creating message data based on data of said data base, said message file and said data base linkage file; and
   a speech creating section creating a speech signal based on the message data created in said data processing section and data of said speech segment file.

2. The audio response/report device according to claim 1, in which said console section includes condition setting means for setting a reporting condition as linkage information; and which further comprises detecting means for detecting that the data items in said data base meet the reporting condition set by said condition setting means.

3. The audio response/report device according to claim 1, in which said console section includes report information setting means for setting a reporting condition and a reporting destination corresponding to the reporting condition as linkage information; and which further comprises detecting means for detecting that the data items in said data base, meet the reporting condition set by said report information setting means; and calling means for calling, in response to a detection of said detecting means, the reporting destination set by said report information setting means.

4. An audio response/report device comprising:
   a communication processing section transferring information with respect to an object system having a data base;
   a memory storing a speech segment file containing speech segment information;
   a storing device for storing a message file containing a message content to be output with a speech signal, and a data base linkage file containing linkage information between data items within said data base and between the data items in said data base and the message content to be converted into the message;
   a console section on which an operator creates and updates, by use of a display plane, the message file and said data base linkage file;
   a data processing section creating message data based on the data items of said data base, said message file and said data base linkage file; and
   a speech creating section creating a speech signal based on the message data created in said data processing section and data of said segment file.

5. The audio response/report device according to claim 4, in which said console section includes condition setting means for setting a reporting condition as linkage information; and which further comprises detecting means for detecting that the data items in said data base extracted from said object system via said communication processing section meet the reporting condition set by said condition setting means.

6. The audio response/report device according to claim 4, in which said console section includes report information setting means for setting a reporting condition and a reporting destination corresponding to the reporting condition as linkage information; and which further comprises detecting means for detecting that the data items in said data base extracted from said object system via said communication processing section meet the reporting condition set by said report information setting means; and calling means for calling, in response to a detection of said detecting means, the reporting destination set by said report information setting means.

7. The audio response/report device according to claim 5, wherein said condition setting means further includes means for setting grouping information corresponding to the reporting condition as the linkage information; and said data processing section further includes data creating means for creating message data of a response message indicating the condition in a same group of said object system based on the grouping information and data extracted from said object system.

8. An audio response/report device comprising:
    a memory storing a speech segment file containing speech segment information;
    a storing device storing a message file containing a message content to be output with a speech signal, and
    a data base linkage file containing linkage information between data items within a data base and between the data items in the data base and the message content with respect to an object system to be converted into the message;
    a console section on which an operator creates and updates, by use of a display plane, the message file and the data base linkage file;
    a data processing section creating message data based on the data items of said data base, said message file and said data base linkage file; and
    a speech creating section creating a speech signal based on the message data created in said data processing section and data of said speech segment file.

9. The audio response/report device according to claim 8, in which said console section includes condition setting means for setting a reporting condition as linkage information; and which further comprises detecting means for detecting that the data items in said data base, which meet the reporting condition set by said condition setting means.

10. The audio response/report device according to claim 8, in which said console section includes report information setting means for setting a reporting condition and a reporting destination corresponding to the reporting condition as linkage information; and which further comprises detecting means for detecting that the data items in said data base, which meet the reporting condition set by said report information setting means; and calling means for calling, in response to a detection of said detecting means, the reporting destination set by said report information setting means.

11. An audio response/report device comprising:
    a data base storing data, which includes data to be converted into a message, with respect to an object system;
    a memory storing a speech segment file containing speech segment information;
    a storing device storing a message file containing a message content to be output with a speech signal;
    a console section on which an operator creates and updates, by use of a display plane, the message file;
    a data processing section creating message data based on linkage information between data items within said data base and between the data items of said data base and said message contents of said message file; and
    a speech creating section creating a speech signal based on the message data created in said data processing section and data of said speech segment file.

12. The audio response/report device according to claim 11, in which said console section includes condition setting means for setting a reporting condition as the linkage information; and which further comprises detecting means for detecting that the data items in said data base meet the reporting condition set by said condition setting means.

13. The audio response/report device according to claim 11, in which said console section includes report information setting means for setting a reporting condition and a reporting destination corresponding to the reporting condition as the linkage information; and which further comprises detecting means for detecting that the data items in said data base, meet the reporting condition set by said report information setting means; and calling means for calling, in response to a detection of said detecting means, the reporting destination set by said report information setting means.

14. An audio response/report device comprising:
    a communication processing section transferring information with respect to an object system having a data base;
    a memory storing a speech segment file containing speech segment information;
    a storing device for storing a message file containing a message content to be output with a speech signal;
    a console section on which an operator creates and updates, by use of a display plane, the message file;
    a data processing section creating message data based on linkage information between data items within said data base and between the data items of said data base and the message contents of the message file; and
    a speech creating section creating a speech signal based on the message data created in said data processing section and data of said segment file.

15. The audio response/report device according to claim 14, in which said console section includes condition setting means for setting a reporting condition as the linkage information; and which further comprises detecting means for detecting that the data items in said data base extracted from said object system via said communication processing section meet the reporting condition set by said condition setting means.

16. The audio response/report device according to claim 14, in which said console section includes report information setting means for setting a reporting condition and a reporting destination corresponding to the reporting condition as linkage information; and which further comprises detecting means for detecting that the data items in said data base extracted from said object system via said communication processing section meet the reporting condition set by said report information setting means; and calling means for calling, in response to a detection of said detecting means, the reporting destination set by said report information setting means.

17. The audio response/report device according to claim 15, wherein said condition setting means further includes means for setting grouping information corresponding to the reporting condition as the linkage information; and said data processing section further includes data creating means for creating message data of a response message indicating the condition in a same group of said object system based on the grouping information and data extracted from said object system.

18. An audio response/report device comprising:
- a memory for storing a speech segment file containing speech segment information;
- a storing device storing a message file containing a message content to be output with a speech signal;
- a console section on which an operator creates and updates, by use of a display plane, the message file;
- a data processing section creating message data based on linkage information between data items within said data base and between the data items of said data base and said message contents of said message file; and
- a speech creating section creating a speech signal based on the message data created in said data processing section and data of said speech segment file.

19. The audio response/report device according to claim 18, in which said console section includes condition setting means for setting a reporting condition as the linkage information; and which further comprises detecting means for detecting that the data items in said data base, meet the reporting condition set by said condition setting means.

20. The audio response/report device according to claim 18, in which said console section includes report information setting means for setting a reporting condition and a reporting destination corresponding to the reporting condition as the linkage information; and which further comprises detecting means for detecting that the data items in said data base, meet the reporting condition set by said report information setting means; and calling means for calling, in response to a detection of said detecting means, the reporting destination set by said report information setting means.

* * * * *